United States Patent
Fichou et al.

(10) Patent No.: US 7,320,034 B2
(45) Date of Patent: Jan. 15, 2008

(54) SYSTEM AND METHOD FOR RESERVING A VIRTUAL CONNECTION IN AN IP NETWORK

(75) Inventors: Aline Fichou, La Colle sur Loup (FR); Jacques Fieschi, St Laurent du Var (FR); Claude Galand, La Colle sur Loup (FR); Jean-Francois Le Pennec, Nice (FR)

(73) Assignee: International Business Machines Corporation, Armonk, NY (US)

( * ) Notice: Subject to any disclaimer, the term of this patent is extended or adjusted under 35 U.S.C. 154(b) by 1455 days.

(21) Appl. No.: 09/811,038

(22) Filed: Mar. 16, 2001

(65) Prior Publication Data

US 2001/0023443 A1    Sep. 20, 2001

(30) Foreign Application Priority Data

Mar. 20, 2000    (EP)    ................................. 00480027

(51) Int. Cl.
*G06F 15/16*    (2006.01)
(52) U.S. Cl. ...................................... 709/227; 709/237
(58) Field of Classification Search ................ 709/227, 709/228, 244, 240, 237; 713/201
See application file for complete search history.

(56) References Cited

U.S. PATENT DOCUMENTS

| | | | | |
|---|---|---|---|---|
| 6,021,263 A * | 2/2000 | Kujoory et al. | ............. | 709/232 |
| 6,363,319 B1 * | 3/2002 | Hsu | ............. | 701/202 |
| 6,529,499 B1 * | 3/2003 | Doshi et al. | ............. | 370/352 |
| 6,563,793 B1 * | 5/2003 | Golden et al. | ............. | 370/236 |
| 6,571,287 B1 * | 5/2003 | Knight et al. | ............. | 709/225 |
| 6,690,678 B1 * | 2/2004 | Basso et al. | ............. | 370/468 |

(Continued)

OTHER PUBLICATIONS

Yau et al., "Migrating Sockets-end System Support for Networking with Quality of Service Guarantees", Networking, IEEE/ACM Transactions on, vol. 6, Issue 6, Dec. 1998, pp. 700-716.*

(Continued)

*Primary Examiner*—Andrew Caldwell
*Assistant Examiner*—Douglas Blair
(74) *Attorney, Agent, or Firm*—John R. Pivnichny; Dillon & Yudell LLP

(57) ABSTRACT

A method and system for reserving a virtual connection from a source workstation to a destination workstation. Packets of data are transmitted over a network between an ingress node of the source workstation and an egress node of the destination workstation. In accordance with the method of the present invention, a reservation request is delivered from the source workstation to a reservation server. The reservation server includes a user database for storing the identification of each user allowed to access to the reservation server and also stores the rights of each user. The reservation server further includes a network database for storing the information describing a network capacity required to set up the virtual connection. A verification is then performed to determine whether or not the reservation request may be validated in view of user information within said source workstation. A second verification is performed to determine whether or not the capacity of said network is sufficient to meet the requirements of the reservation request. In response to the capacity of the network being sufficient to meet the requirements of the reservation request, a virtual connection is established from the ingress node to the egress node.

16 Claims, 5 Drawing Sheets

FIG. 5

U.S. PATENT DOCUMENTS

| | | | |
|---|---|---|---|
| 6,694,429 B1 * | 2/2004 | Kalmanek et al. | 713/153 |
| 6,714,987 B1 * | 3/2004 | Amin et al. | 709/249 |
| 6,744,767 B1 * | 6/2004 | Chiu et al. | 370/395.21 |
| 6,760,336 B1 * | 7/2004 | Mangin et al. | 370/395.21 |
| 6,768,738 B1 * | 7/2004 | Yazaki et al. | 370/392 |
| 6,895,425 B1 * | 5/2005 | Kadyk et al. | 709/203 |
| 6,976,090 B2 * | 12/2005 | Ben-Shaul et al. | 709/246 |
| 2005/0160140 A1 * | 7/2005 | Kadyk et al. | 709/203 |

OTHER PUBLICATIONS

Watanabe et al., "Comparisons of QOS from User's Perspective; Which Provides Better Utility to Users, Best Effort or Reservation-Based Services?", Communications, 1999. APCC/OECC '99, vol. 2 Oct. 18-12, 1999, pp. 1170-1175.*

* cited by examiner

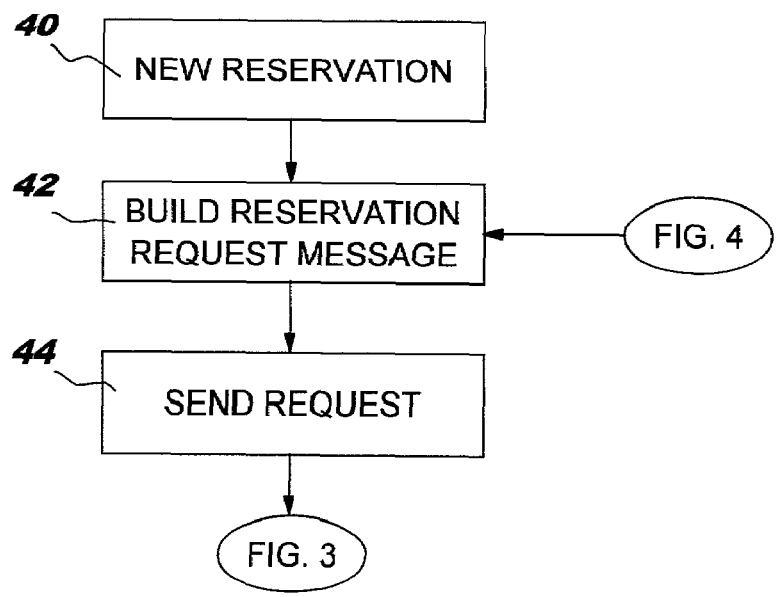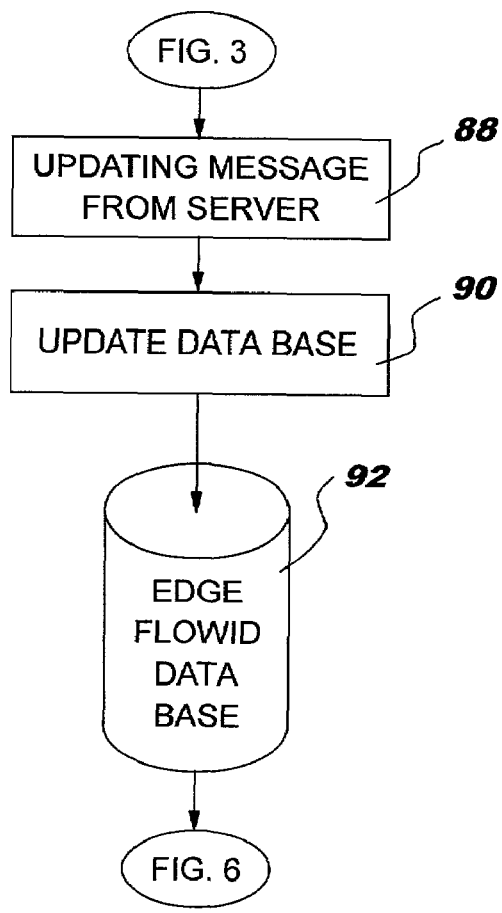

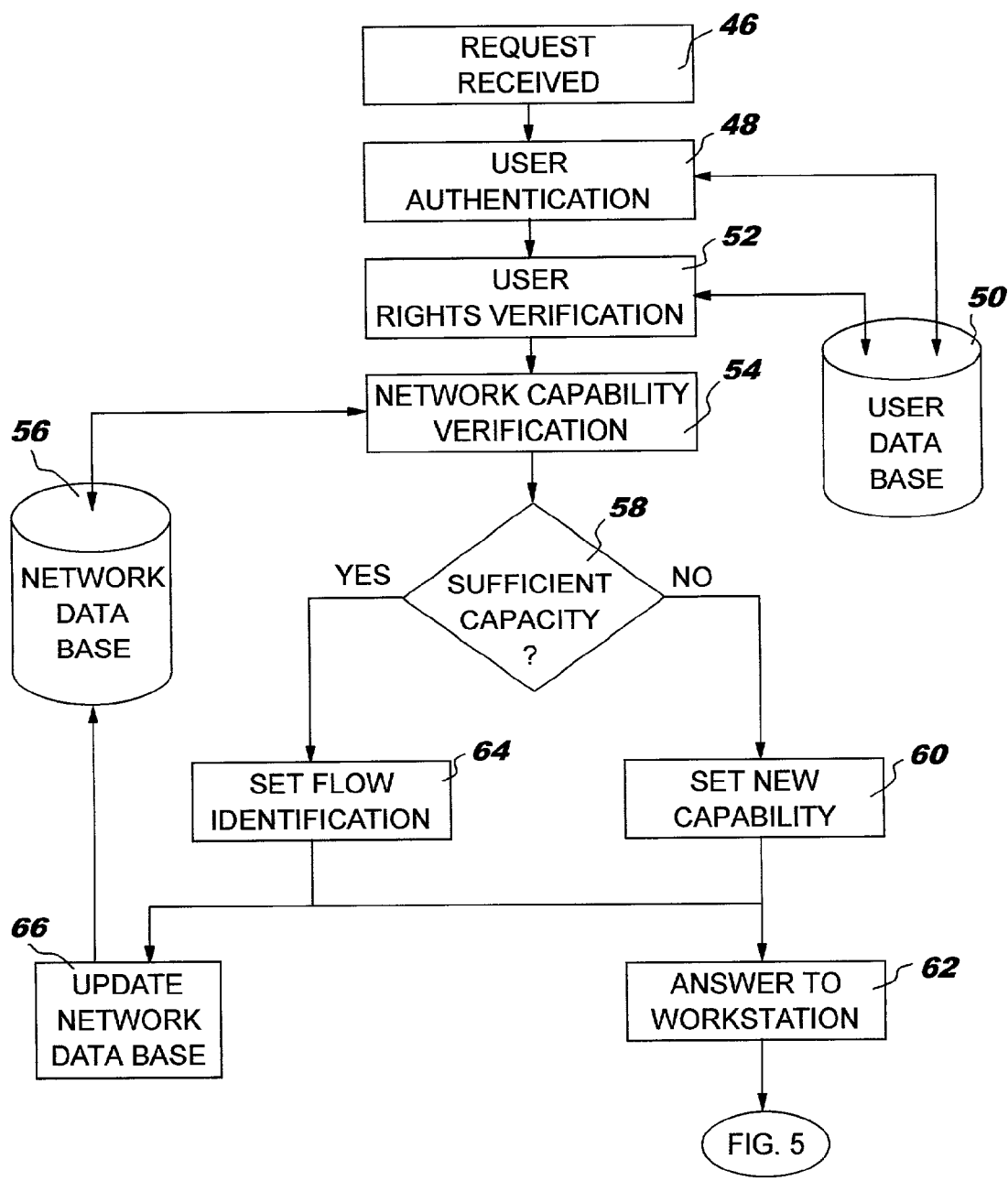

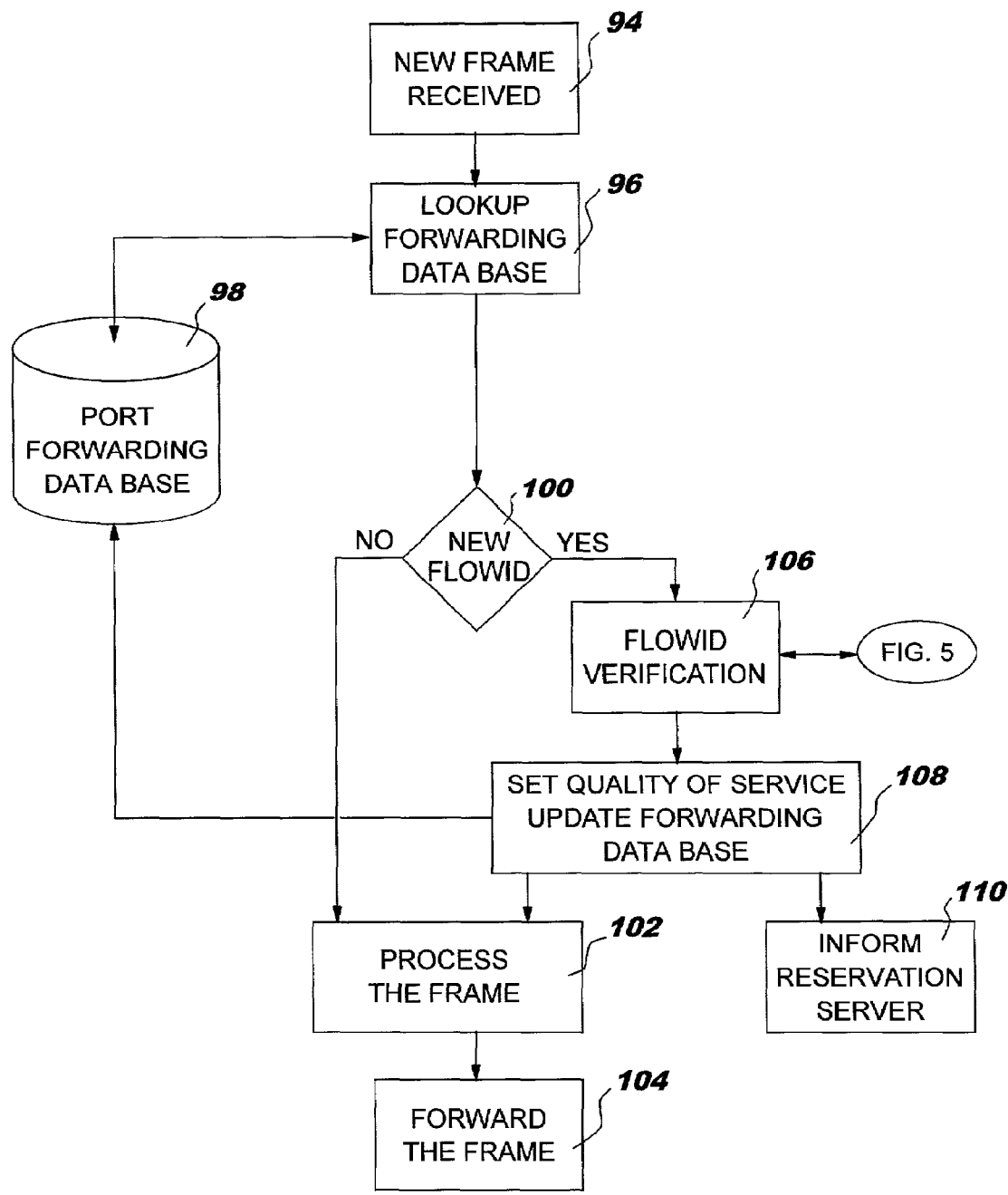

SYSTEM AND METHOD FOR RESERVING A VIRTUAL CONNECTION IN AN IP NETWORK

BACKGROUND OF THE INVENTION

1. Technical Field

The present invention relates in general to reserving virtual connections having a designated Quality of Service (QoS) in an Internet Protocol (IP) network, and relates in particular to a system and method for reserving a QoS designated virtual connection in a network equipped with a reservation server.

2. Description of the Related Art

For a data transmission wherein a connection is first established before the transmission takes place, bandwidth is reserved along the connection path taking error checking into account. Protocols that employ such an approach use a call-connect packet to initiate a session and a connect-confirm response packet to complete the call sequence.

For connection-oriented systems, a virtual circuit (VC) between the two endpoints is allocated to determine a route at call set-up time. During call set-up all necessary resources on the virtual circuit are reserved and logical channels are allocated. Only when the connection is cleared are the reserved resources and logical channels are released.

For Asynchronous Transfer Mode (ATM) networks, a call set-up process is established using virtual paths/virtual circuits (VP/VC). All ATM communications are set up using a controlled method wherein user-specific subscriber options are identified and utilized in establishing each connection. Generally, connections are not established by end users but by network devices or nodes. It is becoming more common, however, to control packet-switched telecommunications directly at the IP network level, which allows end-users to directly establish connections.

A connectionless transmission that is used, for example, at the IP network level, is a form of packet-transmission that does not require communications between the end devices before the transmission of data. Such connectionless packet-transmission employs no virtual circuit and is well-adapted to transmit short messages composed of a limited number of packets. In simple bus or ring networks, there is no problem implementing connectionless systems because the path-choice is limited. In meshed and complex networks, however, the significant problems arise. First, each router must possess substantial processing intelligence for processing the packet header. In addition, the network requires an efficient mechanism to ensure that all routers or nodes have an up-to-date information relating to the overall topology.

The Resource Reservation Protocol (RSVP) is a network-control protocol that enables IP applications to obtain special Qualities of Service (QoS) for their data flows. RSVP produces connection-oriented like communications having an established QoS. RSVP is not however a routing protocol. Instead, it works in conjunction with routing protocols and installs the equivalent of dynamic access lists along the routes that routing protocols calculate. RSVP can be used by end-users to reserve bandwidth within all routers included on the path to the destination. The limitation of RSVP is that if the bandwidth is already used, there is no way to add more reserved communications. In addition, there is no end-user avenue for requesting additional bandwidth.

Another problem with conventional reservation protocols such as RSVP is that they do not provide sufficient scalability since each request is handled by each network device or node in the path used by the connection.

SUMMARY OF THE INVENTION

A method and system for reserving a virtual connection from a source workstation to a destination workstation are disclosed herein. Packets of data are transmitted over a network between an ingress node of the source workstation and an egress node of the destination workstation. In accordance with the method of the present invention, a reservation request is delivered from the source workstation to a reservation server. The reservation server includes a user database for storing the identification of each user allowed to access to the reservation server and also stores the rights of each user. The reservation server further includes a network database for storing the information describing a network capacity required to set up the virtual connection. A verification is then performed to determine whether or not the reservation request may be validated in view of user information within said source workstation. A second verification is performed to determine whether or not the capacity of said network is sufficient to meet the requirements of the reservation request. In response to the capacity of the network being sufficient to meet the requirements of the reservation request, a virtual connection is established from the ingress node to the egress node.

All objects, features, and advantages of the present invention will become apparent in the following detailed written description.

BRIEF DESCRIPTION OF THE DRAWINGS

The above and other objects, features and advantages of the invention will be better understood by reading the following more particular description of the invention in conjunction with the accompanying drawings wherein:

FIG. 2 is a flow chart illustrating steps performed within a requesting source workstation during virtual connection reservation in accordance with a preferred embodiment of the present invention;

FIG. 3 is a flow chart depicting steps performed within a reservation server in response to receiving a reservation request from a source workstation in accordance with a preferred embodiment of the present invention;

FIG. 5 is a flow chart depicting steps performed in an edge node in response to receiving reservation information from a reservation server in accordance with a preferred embodiment of the present invention; and FIG. 6 is a flow chart illustrating steps performed by an ingress edge node while receiving packets from a source workstation in accordance with a preferred embodiment of the present invention.

DETAILED DESCRIPTION OF THE PREFERRED EMBODIMENT

Figure 1:
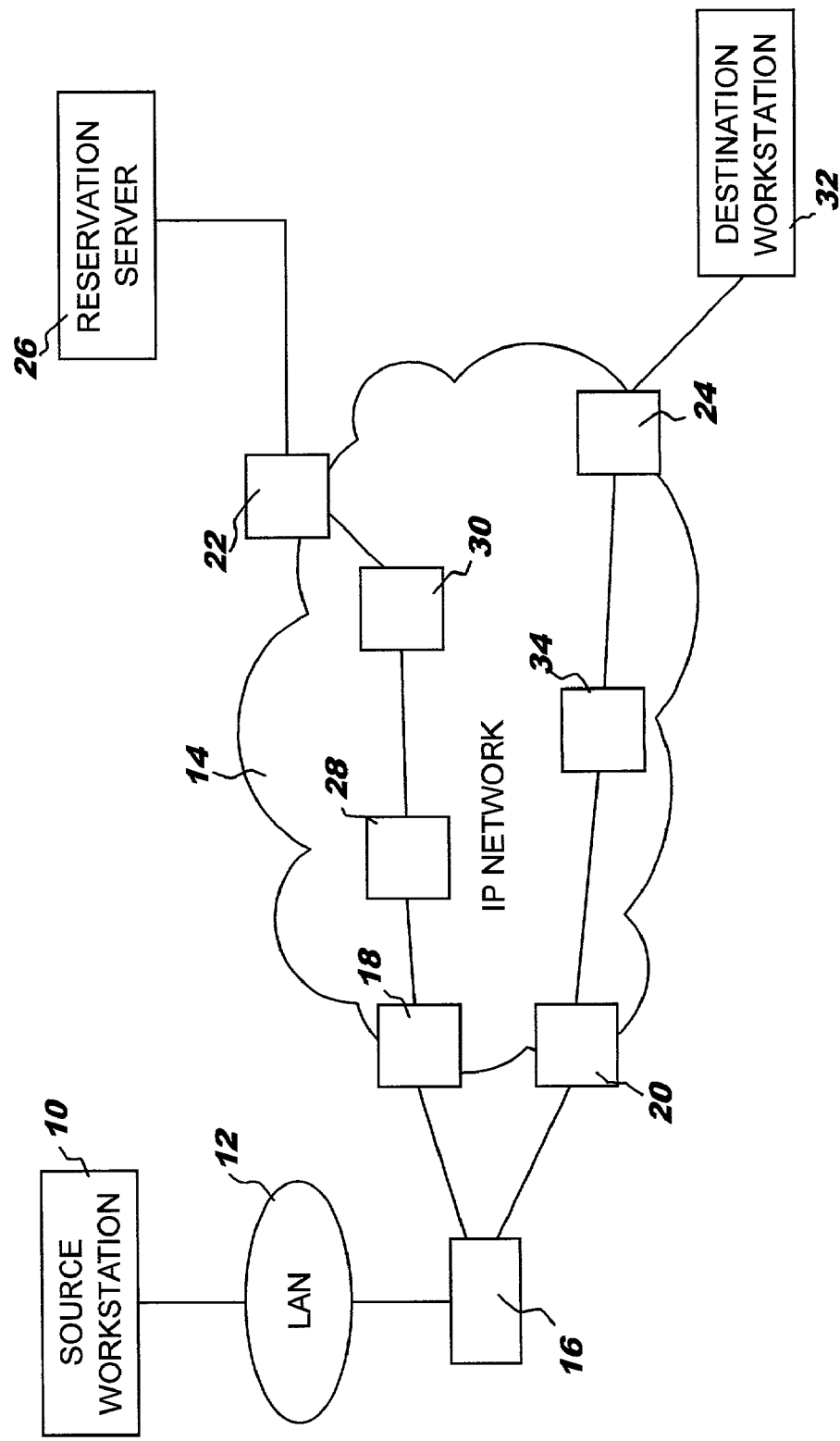
FIG. 1 is a block diagram depicting a data transmission system wherein an IP network is equipped with a reservation server according to the principles of the present invention.

With reference to the figures, and in particular with reference to FIG. 1, there is illustrated a block diagram depicting a data transmission system wherein an IP network is equipped with a reservation server according to the principles of the present invention.

The data transmission system shown in FIG. 1 includes a source workstation 10 attached to a LAN 12. Source workstation 10 may access an Internet Protocol (IP) network 14 through a default router 16. Default router 16 is physically connected to several edge devices including edge nodes 18 or 20, which are themselves connected to edge nodes 22 and 24 though IP network 14.

In accordance with the depicted embodiment, a reservation server 26 is included within the data transmission system. Reservation server 26 may be accessed by any workstation such as the source workstation 10 through several intermediary nodes such as backbone nodes 28 and 30. When source workstation 10 wants to send data packets to another workstation such as destination workstation 32, a virtual connection through backbone nodes such as backbone node 34 is established by reservation server 26 between source workstation 10 and destination workstation 32.

Although source workstation 10 may alternately utilize IP network 14 in a non-reserved mode, in accordance with the present invention, it may deliver a reservation request to reservation server 26 when required to accommodate a Quality of Service (QoS) requirement for a particular application. Such a reservation may be a direct reservation to reservation server 26, or a generic reservation forwarded by default router 16 to reservation server 26. Reservation server 26 performs user authentication and determines whether or not the reservation can be granted to this user. If so, the edge nodes involved in the connection, such as nodes 20 and 24, are informed of the new reserved flow, while in parallel, requesting workstation 10 is informed that it can proceed with the communication. A flow identification may be provided to speed up the recognition and validation of that flow at ingress node 20.

With reference to FIG. 2, there is depicted a flow chart illustrating steps performed within a requesting source workstation during virtual connection reservation in accordance with a preferred embodiment of the present invention. When a user of source workstation 10 needs a new reservation (step 40), which may either be a manual reservation or a reservation requested by an upper-level application, a reservation request message is constructed (step 42) including the necessary parameters such as destination, bandwidth, Quality of Service, type protocol or port number. A specified reservation duration may also be provided or an indication that the reservation is valid until a cancellation message is sent to the reservation server. It should be noted that a reservation request message can also be constructed when the workstation receives new parameters from the reservation server in response to the request from the source workstation being rejected for reasons explained below with reference to FIG. 4. Once the reservation request message is ready, it is sent (step 44) to the reservation server. The message is typically followed by a classical authentication sequence as explained with reference to FIG. 3.

Turning to FIG. 3, there is illustrated a flow chart depicting steps performed within a reservation server in response to receiving a reservation request from a source workstation in accordance with a preferred embodiment of the present invention. After receiving the reservation request (step 46), the reservation server initiates user authentication (step 48), which can be a LogonID/password verification or a more sophisticated authentication using certificates. This verification involves the use of a database 50 storing the identification of each user and the user/customer profile when the user of the source workstation is one of multiple users associated with a customer of the server.

Next, a user rights verification (step 52) is performed using the same database 50 which defines for each user which kind of request he is allowed to perform. The result of such a verification may be in terms of bandwidth required for a call, destination allowed, QoS, etc. The reservation results in an extra cost for the customer in accordance with the type and duration of the communication to be performed. It therefore may be desirable to provide a way for the customer to manage the authorization for each user of the source workstation. If the verification of the user rights fails, the reservation request is rejected by delivering a rejection message (not shown) to the source workstation including a code for the rejection.

If the request is validated, the process includes steps for assessing the network's ability to handle the request (step 54). To perform such a network capability assessment, a network database 56 is utilized to determine the remaining capacity, or bandwidth, or each link in the network. The capacity requested for setting up a virtual connection from ingress node 20 to egress node 24 has to meet QoS parameters within the network. If it is determined that there is insufficient network capacity of handling the reservation request (step 58), an alternate capability proposal is derived with request to the requesting source workstation (step 60). In such a case, this new capability may be either a lower bandwidth or a lower QoS, which is then sent back to the requesting workstation (step 62). While the alternate capability is being delivered the requesting workstation, an updating message is transmitted to the edge nodes as explained blow with reference to FIG. 5.

If the network is able to support the reservation request of the source workstation, a flow identification is set (step 64). Such a flow identification includes not only a FlowID field, but also parameters such as source address, destination address, QoS, port number, duration, bandwidth, route or path within the network. Some of this information, such as bandwidth, duration, QoS, is used to update network database 56 (step 66). An answer including the acceptance of the reservation request is sent to the requesting workstation (step 62).

It should be noted that some parameters such as source address, destination address, port number, route or path within the network, and Qos are delivered to the edge nodes of the virtual connection as explained below with reference to FIG. 5.

Figure 4:
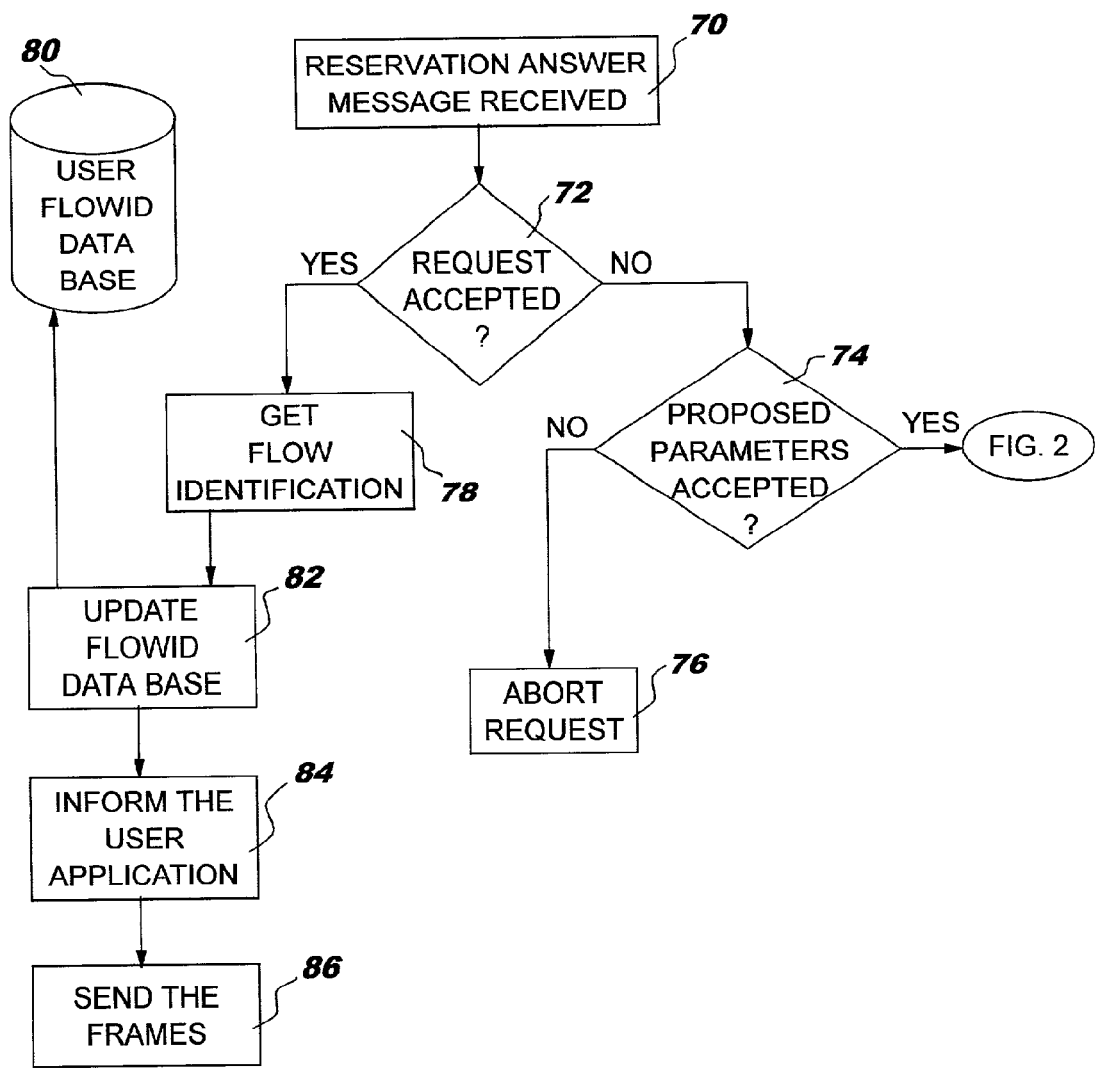
FIG. 4 is a flow chart illustrating steps performed in a source workstation in response to receiving a reservation message from a reservation server in accordance with a preferred embodiment of the present invention.

With reference to FIG. 4, there is depicted a flow chart illustrating steps performed in a source workstation in response to receiving a reservation message from a reservation server after the reservation server has processed the workstation reservation request in accordance with a preferred embodiment of the present invention. After receiving the reservation answer message from the reservation server (step 70), a test is performed (step 72) to determine whether or not the reservation answer message is an accepted request confirmation or an alternate capability proposal from the reservation server as explained with reference to step 60 in FIG. 3. If the reservation request has not been accepted by the reservation server, a test is performed to determine whether or not the new parameters proposed by the reservation server are acceptable by the user of the workstation (step 74). If so, a new reservation request message is constructed as explained with reference to FIG. 2. If, however, the new parameters are not accepted, the reservation request is aborted (step 76).

If the request is accepted by the reservation server, the workstation obtains a flow identification defined by a FlowID (step 78) that the user will use within each packet header to identify the flow to which the packet belongs. Such a FlowID may be a flow label used within IP version 6 (IPv6) or a MPLS label or any identification field within the protocol used by the workstation to communicate with the ingress node. It should be noted that the flow identification is employed in a preferred embodiment but could be bypassed when IP version 4 (IPv4) is used natively, resulting in a more complicated identification on the ingress node port.

After a flow identification or FlowID is obtained, a database 80 storing the user FlowIDs for local accounting is updated (step 82). Next, the user application running on the source workstation is informed of the FlowID (step 84) and may start sending the frames of the flow (step 86).

Turning to FIG. 5, there is illustrated a flow chart depicting steps performed in an edge node in response to receiving reservation information from a reservation server in accordance with a preferred embodiment of the present invention. As explained above with reference to FIG. 3, an update message is transmitted to the edge nodes by the reservation server after the capacity of the network to fulfill the request has been verified. As illustrated in FIG. 5, this update message received by the edge nodes (step 88) is used for updating the reservation message.

Edge nodes include ingress node 20 (see FIG. 1), which receives data frames from the source workstation, and egress node 24, which receives data frames from the ingress node through the IP network. The data frames are identified either by the FlowID set by the reservation server or by a route identification defined by a RouteID which has been substituted to the FlowID by the ingress node. Such a substitution is provided by the reservation server either to both ingress node and egress node, or only to the ingress node. The information may be the identification of a already known route or all information needed to define a new route. It should be noted that, when the information about the route is sent only to the ingress node, it is necessary to transmit a complete header within each packet of the flow, whereas some data fields such as the source address, the destination address, the port number and the Quality of Service are not transmitted within the packet header when the information is transmitted to both ingress and egress nodes.

When a substitution from FlowID to a RouteID occurs, not only is the FlowID field is changed, but also fields such as QoS or the type of service (ToS). The objective is to rebuild the same packet at the output of the egress node as the packet at the input of the ingress node, even if some fields are changed within the network except fields such as Time To Live (TTL) which must always be decremented. Furthermore, if replacing the FlowID by a RouteID, it may be useful in the case where two networks are involved, to replace the FlowID corresponding to the first network by a new FlowID corresponding to the second network, the value of this new FlowID being provided by the reservation server of the second network to the egress node of the first network.

Returning to FIG. 5, the update message received from the reservation server is used to update (step 90) a database 92 storing the FlowIDs. The stored information will be used only when a packet is received at the interface of the ingress node as illustrated in FIG. 6.

With reference to FIG. 6, there is depicted a flow chart illustrating steps performed by an ingress edge node while receiving packets from a source workstation in accordance with a preferred embodiment of the present invention. When a new packet is received by the ingress node (step 94), the interface process first performs a lookup (step 96) in its local port forwarding database 98 to check whether the flow to which the received packet belongs is a known flow or a new flow (step 100). If it is a known flow, the packet is processed and modified (step 102) before being forwarded (step 104). For example, non-reserved flows may be forwarded with minor changes such as only TTL decrementation. Likewise, reserved flows may have a new QoS classification and a new identification field. Some fields such as source address and destination address may even be removed if the identification field with the network is unique when the egress node has been informed by the reservation server and is able to replace these address fields within the packet.

If the received packet corresponds to a new flow, a FlowID verification is performed (step 106) by comparing the FlowID to reserved flows stored in database 92 as explained in FIG. 5. When the flow corresponds to an existing flow in the database, the QoS of the flow is set (step 108) and an update of the port forwarding database 98 is performed in order to find and directly process the subsequent frames of this flow (step 96). The packet is then processed and modified (step 102) before being transmitted (step 104). In addition, the reservation server is informed that a first packet of a new flow has been received and processed which will start a connection timer for this flow for accounting of the use of this reservation. It should be noted that when the flow is not recognized as a reserved flow (step 106), the packet is processed as a non-reserved flow. In this case, in order to verify that the FlowID is valid, not only the existence of the FlowID is verified, but also the source and destination addresses are checked with the port number. The FlowID and the other above listed IP header parameters are compared to the information given by reservation server 26 to ingress node 20 for this flow. This verification prevents non-authorized users to reserve bandwidth on the network just by using random FLowIDs as they will never be sent to destination.

What is claimed is:

1. A method for reserving a virtual connection from a source workstation to a destination workstation within a network to allow data packets to be transmitted between an ingress node of said source workstation and an egress node of said destination workstation, said method comprising:
   sending a reservation request for a virtual connection from said source workstation to a reservation server, wherein said reservation server includes connection setup means for setting up a virtual connection that meets a predefined Quality of Service (QoS) requirement from said ingress node to said egress node;
   determining whether or not said reservation request can be validated based on user information within said source workstation, wherein said user information is accessible by said reservation server;
   in response to a determination that said reservation can be validated based on user information within said source workstation, determining whether or not the capacity of said network is sufficient to meet requirements of said reservation request; and
   in response to a determination that the capacity of said network being sufficient to meet requirements of said reservation request, establishing a virtual connection from said ingress node to said egress node.

2. The method of claim 1, wherein said determining whether or not said request can be validated further includes:
   verifying an authentication of a user associated with said user information; and
   verifying user rights of said user to obtain said virtual connection.

3. The method of claim 1, wherein said method further includes in response to an insufficient capacity of said network with respect to a previous reservation request, delivering a new reservation request from said source workstation to said reservation server, wherein said new reservation request includes new parameters that are set in accordance with the capacity of said network as reported from said reservation server to said source workstation.

4. The method of claim 1, wherein said method further includes delivering from said reservation server to said ingress and egress nodes information required to set up a virtual connection from said ingress node to said egress node and a flow identification of communications to be established such that said ingress node may transmit any data packet received from said source workstation over said virtual connection.

5. The method of claim 4, wherein said information sent by said reservation server to said ingress and egress nodes to set up a virtual connection includes a FlowID identifying a flow that corressponds to communications to be established over said virtual connection.

6. The method of claim 5, wherein said method further includes comparing a FlowID of a new packet received by said ingress node with at least one FlowID corresponding to at least one reserved virtual connection that has been established from said reservation server to said ingress node.

7. The method of claim 5, wherein said method further includes delivering a RouteID from said reservation server to said ingress and egress nodes, wherein said RouteID identifies a route already known by said ingress and egress nodes.

8. The method of claim 4, wherein headers of all packets belonging to a flow using said virtual connection includes a source address, a destination address, a port number, and a Quality of Service identifier.

9. An apparatus for reserving a virtual connection from a source workstation to a destination workstation within a network to allow data packets to be transmitted between an ingress node of said source workstation and an egress node of said destination workstation, said apparatus comprising:
    means for sending a reservation request for a virtual connection from said source workstation to a reservation server, wherein said reservation server includes connection setup means for setting up a virtual connection that meets a predefined Quality of Service (QoS) requirement from said ingress node to said egress node;
    means for determining whether or not said reservation request can be validated based on user information within said source workstation, wherein said user information is accessible by said reservation server;
    in response to a determination that said reservation request can be validated based on user information within said source workstation, means for determining whether or not the capacity of said network is sufficient to meet requirements of said reservation request; and
    in response to a determination that the capacity of said network being sufficient to meet requirements of said reservation request, means for establishing a virtual connection from said ingress node to said egress node.

10. The apparatus of claim 9, wherein said determining whether or not said request can be validated further includes:
    means for verifying an authentication of a user associated with said user information; and
    means for verifying user rights of said user to obtain virtual connections.

11. The apparatus of claim 9, wherein said apparatus further includes in response to an insufficient capacity of said network with respect to a previous reservation request, means for delivering a new reservation request from said source workstation to said reservation server, wherein said new reservation request includes new parameters that are set in accordance with the capacity of said network as reported from said reservation server to said source workstation.

12. The apparatus of claim 9, wherein said apparatus further includes means for delivering from said reservation server to said ingress and engress nodes information required to set up a virtual connection from said ingress node to said engress node and a flow identification of communications to be established such that said ingress node may transmit any data packet received from said source workstation over said virtual connection.

13. The apparatus of claim 12, wherein said information sent by said reservation server to said ingress and engress nodes to set up a virtual connection includes a FlowID identifying a flow that corresponds to communications to be established over said virtual connection.

14. The apparatus of claim 13, wherein said apparatus further includes means for comparing a FlowID of a new packet received by said ingress node with at least one FlowID corresponding to at least one reserved virtual connection that has been established from said reservation server to said ingress node.

15. The apparatus of claim 13, wherein said apparatus further includes means for delivering a RouteID identifies a route already known by said ingress and engress nodes.

16. The apparatus of claim 13, wherein headers of all packets belonging to a flow using said virtual connection includes a source address, a destination address, a port number, and a Quality of Service identifier.

* * * * *